United States Patent [19]

Cristante

[11] Patent Number: 4,572,445

[45] Date of Patent: Feb. 25, 1986

[54] HOUSEHOLD APPLIANCE FOR TREATING FRUIT AND VEGETABLES

[75] Inventor: Guido Cristante, Omegna, Italy

[73] Assignee: I.P.E. Nuova Bialetti S.p.A. Industria Prodotti Elettrodomastici, Crusinallo di Omegna, Italy

[21] Appl. No.: 577,151

[22] Filed: Feb. 6, 1984

[30] Foreign Application Priority Data

Feb. 4, 1983 [IT] Italy ............................. 20688/83[U]
Feb. 4, 1983 [IT] Italy ............................. 20689/83[U]

[51] Int. Cl.$^4$ ............................................. B02C 18/12
[52] U.S. Cl. ..................................... 241/37.5; 241/84; 241/273.3
[58] Field of Search .................... 241/37.5, 92, 83, 84, 241/273, 273.1, 273.2, 273.3, 282.1, 282.2

[56] References Cited

U.S. PATENT DOCUMENTS

| | | | |
|---|---|---|---|
| 4,095,751 | 6/1978 | Artin | 241/37.5 |
| 4,362,277 | 12/1982 | Amiot | 241/37.5 |
| 4,373,677 | 2/1983 | Kunihiro | 241/37.5 |

FOREIGN PATENT DOCUMENTS 307581 8/1955 Switzerland ..................... 241/273.2

*Primary Examiner*—Howard N. Goldberg
*Assistant Examiner*—Timothy V. Eley
*Attorney, Agent, or Firm*—Karl F. Ross; Herbert Dubno

[57] ABSTRACT

A household appliance for squeezing, comminuting or otherwise treating fruits and vegetables comprises a motor housing with a base having a lateral extensions from which a drive shaft extends upward. A cylindrical treatment vessel fits onto that extension with a hub which surrounds the drive shaft and accommodates a tubular stub shaft of an implement to be driven, the vessel having a cover which is attachable thereto through a bayonet coupling and carries a peripheral detent which must enter a slot of the motor housing and be engaged by a retractable latch to trip a microswitch enabling the motor to operate. One implement connectable with the drive shaft comprises a centrifugal grater with an annular screen and an abrasive bottom onto which produce to be comminuted can be pressed from above by a pusher passing through a guide tube of the cover; the pusher has a hollow stem closed at its lower end and cut away laterally to form an aperture with lateral edges closely adjoining the inner screen surface of the rotating grater, the edge downstream in the direction of rotation scraping off adhering fragments such as peels or fibers which can be removed during operation by withdrawing the plunger.

11 Claims, 7 Drawing Figures

HOUSEHOLD APPLIANCE FOR TREATING FRUIT AND VEGETABLES

FIELD OF THE INVENTION

My present invention relates to a device, especially a household appliance, designed for squeezing, comminuting or otherwise treating fruits and vegetables.

BACKGROUND OF THE INVENTION

Household appliances of this type, designed for the extraction of juices from citrus fruit, are known in which a basket-shaped centrifugal grater with an abrasive disk as its bottom and an annular screen as its peripheral wall is rotated about a vertical axis while a fruit to be squeezed is being pressed down with the aid of a pusher against the abrasive bottom. The resulting pulp fragments are centrifugally thrown onto the peripheral screen where the juice passes out through its perforations while the solids are retained. In order to permit the continuous extraction of the juice, the solids must be prevented from accumulating along the inner screen surface of the grater. For this purpose it has already been proposed to use a dynamic separator together with a particular screen configuration enabling the juices to be collected in a labyrinthal structure while letting the solids be deflected upward for removal from the grater. Such a dynamic separator, however, does not scrape the screen and is difficult to clean on account of its complicated construction. Manually operated screen scrapers, which are also known, can be used only when the device is at standstill.

OBJECTS OF THE INVENTION

An object of my present invention is to provide an improved produce-treating device with a rotating implement, such as the aforedescribed centrifugal grater, having means for enabling the extraction of peels, fibers and other fragments during operation.

A more general object of my invention is to provide a produce-treating device—especially for household use—having internal rotary parts to which access is positively prevented while they are in motion.

SUMMARY OF THE INVENTION

In conformity with the last-mentioned object, a device according to my invention comprises a power unit whose housing is provided with a laterally extending platform onto which a cylindrical treatment vessel can be fitted, a drive shaft coupled with a motor in the power unit rising from that platform to enter a hub of the vessel fitted thereon. A rotatable implement in the vessel has a depending tubular stub shaft engageable with the drive shaft of the power unit for entrainment thereby. The vessel has a removable cover which overlies the rotatable implement in a closure position, this cover and the housing of the power unit being provided with coacting formations which retain the cover on the vessel in that position. An energizing circuit for the drive motor includes switch means on the housing closable by one of the coacting formations in the closure positon of the cover for enabling rotation of the drive shaft and of the implement connected therewith. Thus, removal of the cover will open the energizing circuit of the motor and arrest the rotating implement.

The coacting formations advantageously include a detent in the form of a peripheral projection of the cover, a stop on the housing, and a spring-loaded latch also carried on the housing so as to bear upon the projection of the cover for urging it against the stop in the closure position. The latch is retractable against its spring force for enabling a movement of the projection toward the stop in a closing operation and away from the stop in an opening operation.

Preferably, the cover is rotatable relatively to the vessel into its closure position in which it is positively arrested by limiting means such as a bayonet coupling; mating screw threads on the vessel and the cover could also be used for positively defining the closure position. A similar bayonet coupling can be used between the platform and the lower end of the vessel for indexing the latter against rotation relative to the arrested cover.

Another feature of my present invention, preferably used in combination with the protective arrangement just described, resides in the use of a centrifugal grater of the above-discussed type as the produce-treating implement inside the vessel whose cover is then penetrated by a vertical guide tube offset from its axis for enabling the introduction of produce into the grater under pressure from a pusher receivable in that guide tube. The pusher has a hollow stem with a closed lower end and with a side aperture above that end which is bounded by lateral edges closely adjoining the inner screen surface upon its introduction into the guide tube, the downstream lateral edge (as viewed in the direction of rotation of the grater) scraping the inner screen surface to remove adhering fragments to the interior of the stem for withdrawal from the grater when the pusher is extracted. Neither this extraction nor a subsequent reinsertion of the pusher requires the centrifugal grater to be stopped. The handling of the pusher, whose stem must of course have an end projecting upward from the guide tube, does not subject the user to any risk or injury.

BRIEF DESCRIPTION OF THE DRAWING

The above and other features of my present invention will now be described in detail with reference to the accompanying drawing in which.

SPECIFIC DESCRIPTION

Figure 1:
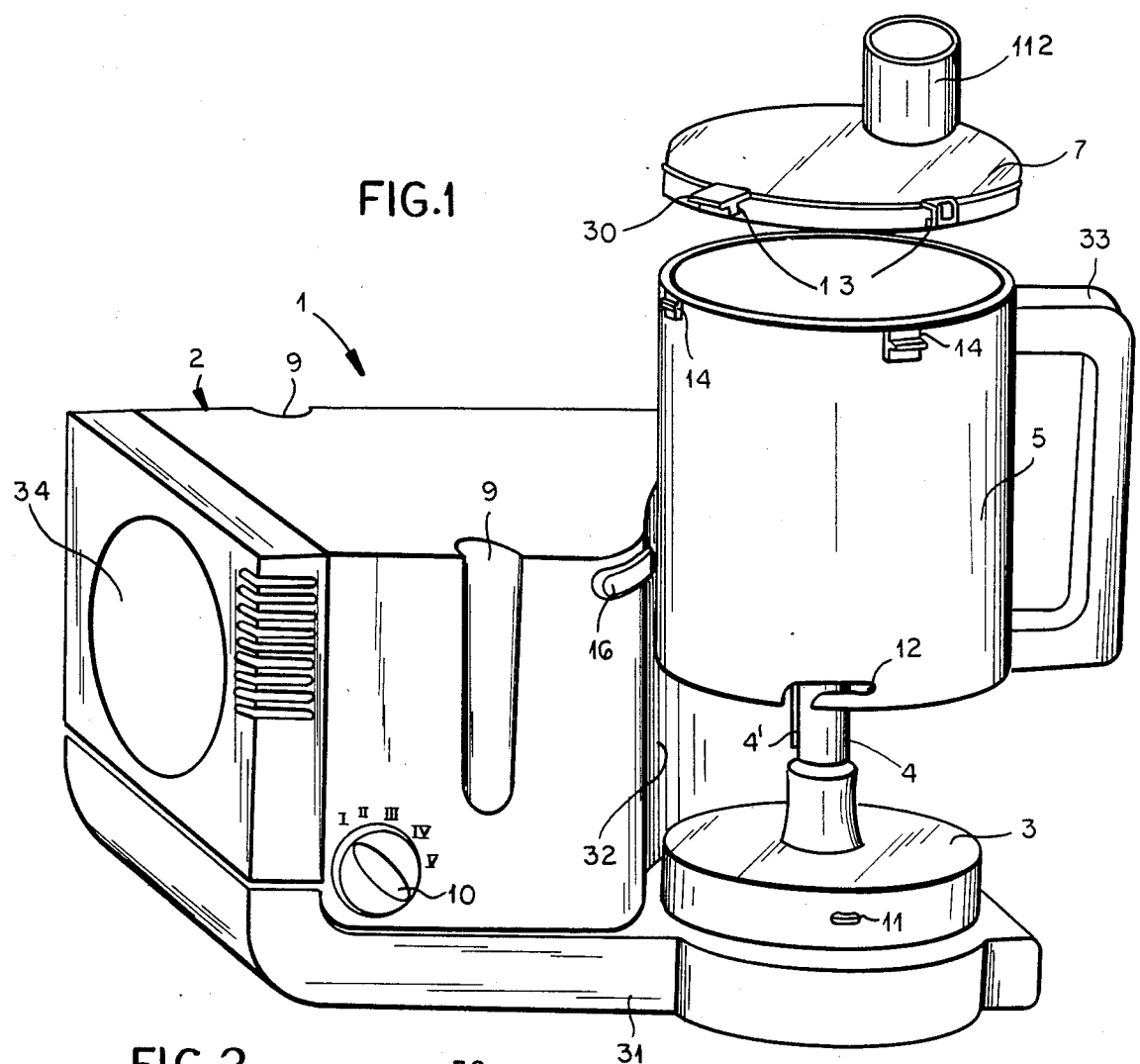
FIG. 1 is a perspective exploded view of a produce-treating household appliance according to my invention, shown in a position of partial assembly.
Figure 2:
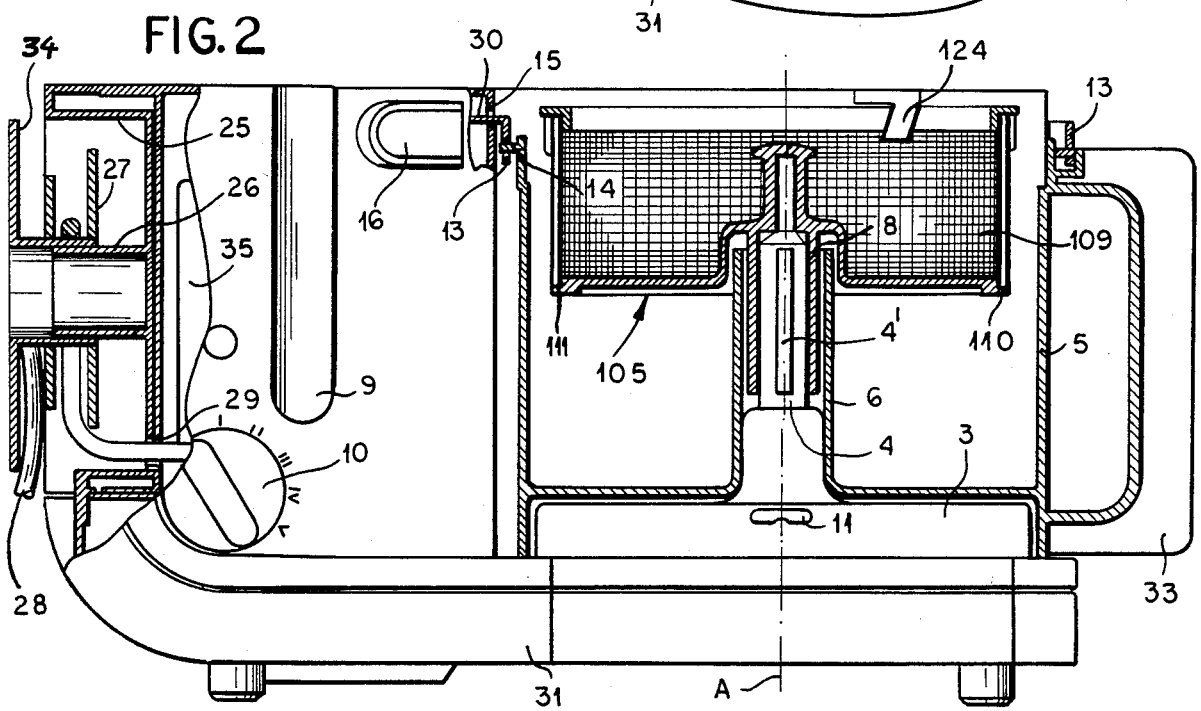
FIG. 2 is an elevational view, partly in section, of the device of FIG. 1 with the cover of its treatment vessel removed.

As shown in FIG. 1, a household appliance 1 for the processing of fruits or vegetables pursuant to my invention comprises a housing 2 of a power unit containing an electric motor 35 partly seen in FIG. 2. A base 31 of the housing contains a nonillustrated step-down transmission coupling the motor with a drive shaft 4 which rises from a platform 3 on a lateral extension of that base. A cylindrical treatment vessel 5, centered on an axis A, adjoins a correspondingly curved wall 32 of housing 2 and is internally provided with a hub 6 centered on the same axis so as to receive the drive shaft 4 when the vessel is lowered onto base 31 where a depending skirt encloses the platform 3. The vessel has a handle 33 enabling it to be lowered onto and lifted off housing base 31.

A key 4' on shaft 4 fits into a groove of a tubular stub shaft 8 of a centrifugal grater 105, more fully described hereinafter with reference to FIGS. 5-7, for rotatively entraining same. The open top vessel 5 is closable by a cover 7 which is penetrated by a guide tube 112 for reasons that will become apparent. Vertical finger grooves 9 on opposite sides of housing 2 facilitate its handling by a user.

Figure 3:
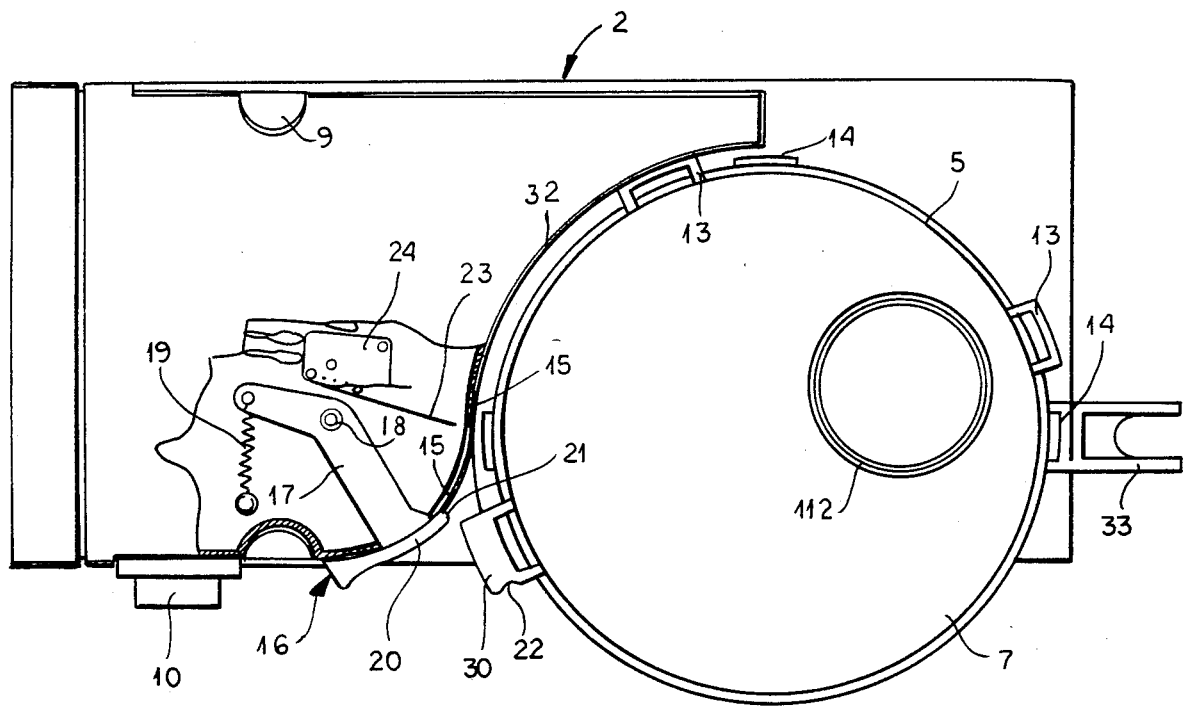
FIG. 3 is a top view of the device, with parts broken away, showing the cover in a position approaching closure.
Figure 4:
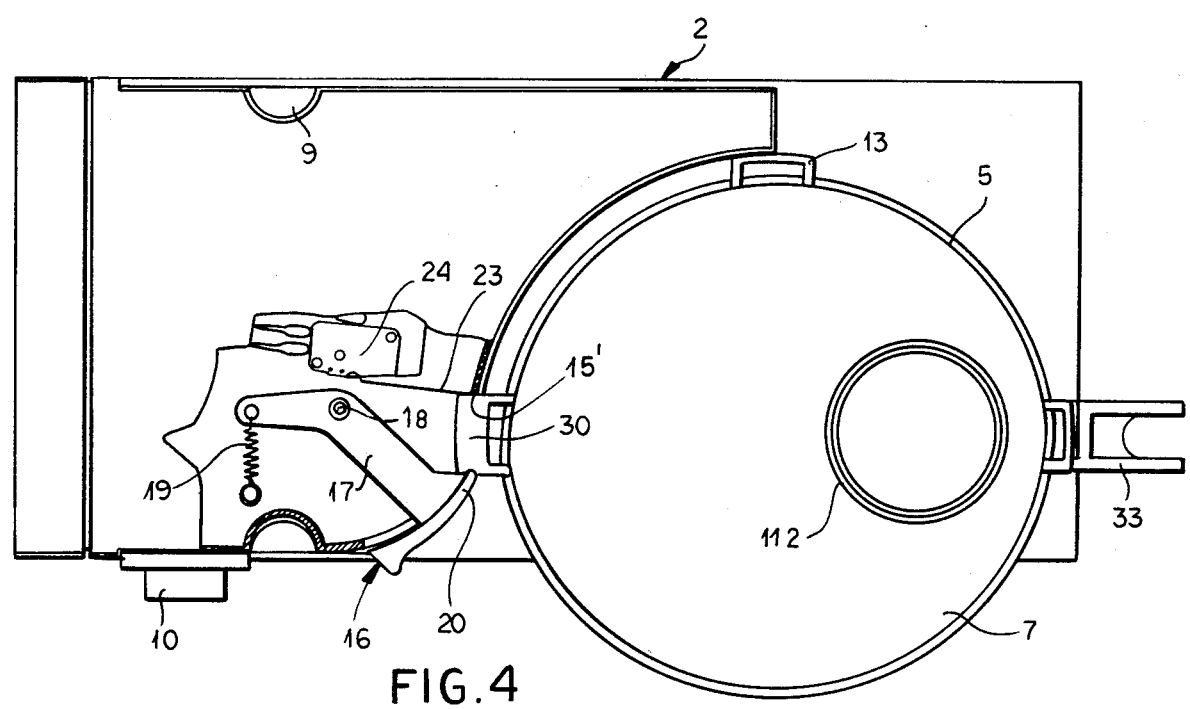
FIG. 4 is a view similar to FIG. 3, with the cover shown in its closure position.

Platform 3 and the skirt of vessel 5 are respectively provided with bayonet lugs 11 and complementary incisions 12 serving to index the vessel 5 on the base 31 in a position preventing further clockwise rotation of the vessel as viewed in FIGS. 1, 3 and 4.

Motor 35 is connectable to a wall socket via a cable 28 which between periods of use can be wound up on a reel 27 for storage in a compartment 25 of housing 2 having a stud 26 for receiving that reel. The reel is integral with a lid 34 serving to close that compartment at times of nonuse.

Cable 28 passes through a hole 29 into the interior of housing 2 where it is connected to the energizing circuit of the motor with interposition of a potentiometer controlled by a manually settable knob 10 for the selection of a suitable motor speed. This energizing circuit includes a microswitch 24, shown in FIGS. 3 and 4, with a resilient tongue 23 projecting inside the housing toward its curved wall 32 in the vicinity of a slot 15 thereof within which a lever 17 is swingable about a pivot 18. Lever 17 is biased by a spring 19 in a counterclockwise direction, as viewed in FIGS. 3 and 4, toward an end 15' of the slot which acts as a stop for a detent 30 projecting outward from the periphery of cover 7. The cover also carries bayonet hooks 13 coacting with respective ramps 14 on the outer rim of vessel 5 to define a closure position for the cover. In that closure position, with vessel 5 indexed on base 31 as described above, detent 30 enters the slot 15 and comes to rest against stop 15' as illustrated in FIG. 4, thereby repressing the tongue 23 to close the microswitch 24. Such insertion of detent 30 into slot 15, however, requires a prior retraction of a latch 16 which is carried by lever 17 and has a head 20 normally obstructing that slot. With the latch 16 manually retracted against the force of spring 19, as shown in FIG. 3, cover 7 is free to be rotated into the switch-closing position of FIG. 4 concurrently with the interengagement of bayonet formations 13 and 14. A tip 21 of latch head 20, upon its release by the user, enters a notch 22 of detent 30 and presses it against the stop 15' to maintain the working position of FIG. 4.

The safety features discussed with reference to FIGS. 1-4, namely indexing and rotation-limiting formations 11-14, detent 30, latch 16 and circuit breaker 24, could be utilized with a variety of rotatable implements for pressing, shredding, peeling or otherwise processing fruits and vegetables. However, the centrifugal grater 105 about to be described in greater detail with reference to FIGS. 5-7 is particularly suitable for use in my improved appliance.

Figure 5:
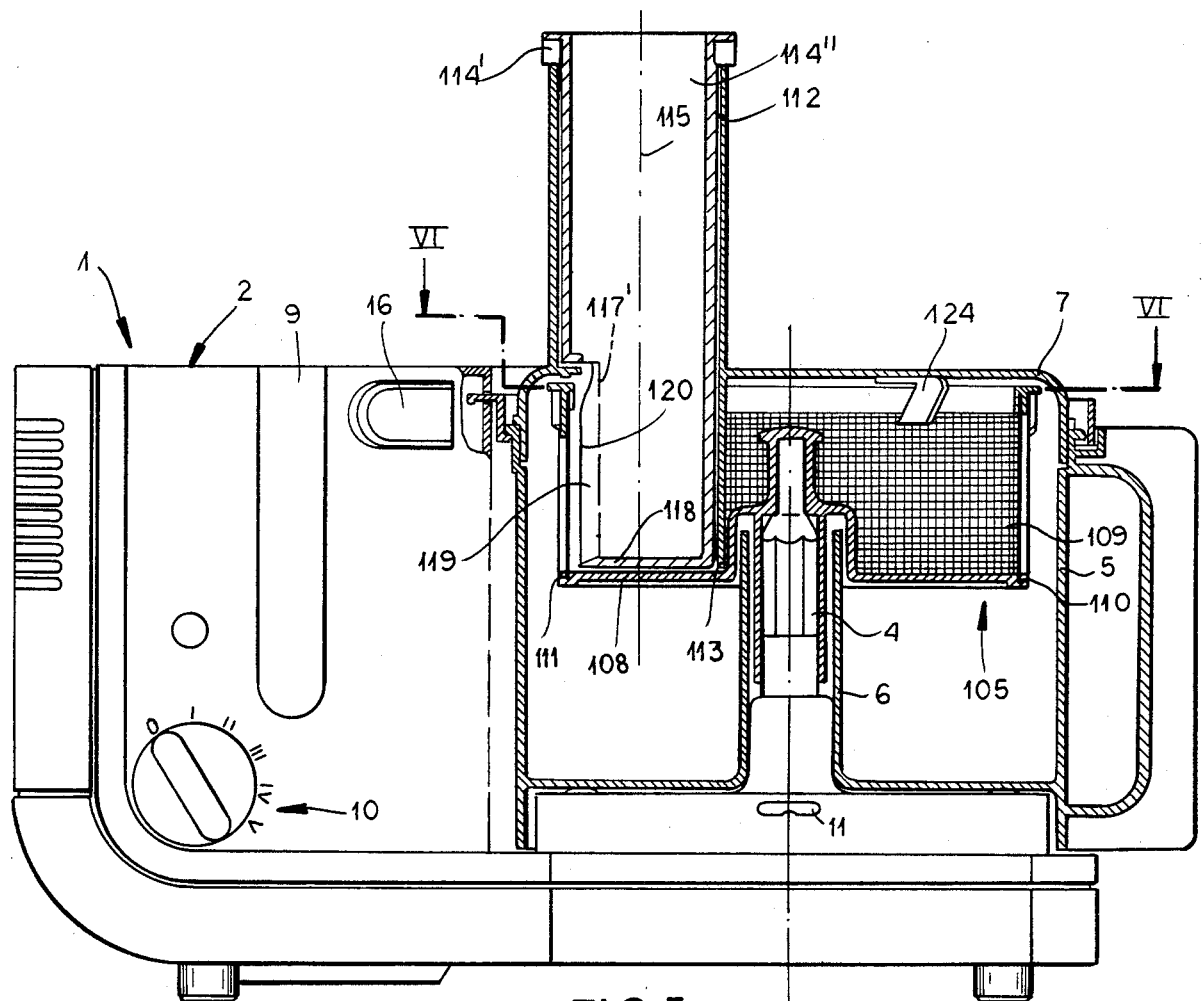
FIG. 5 is a view similar to that of FIG. 2 with the cover in place.
Figure 6:
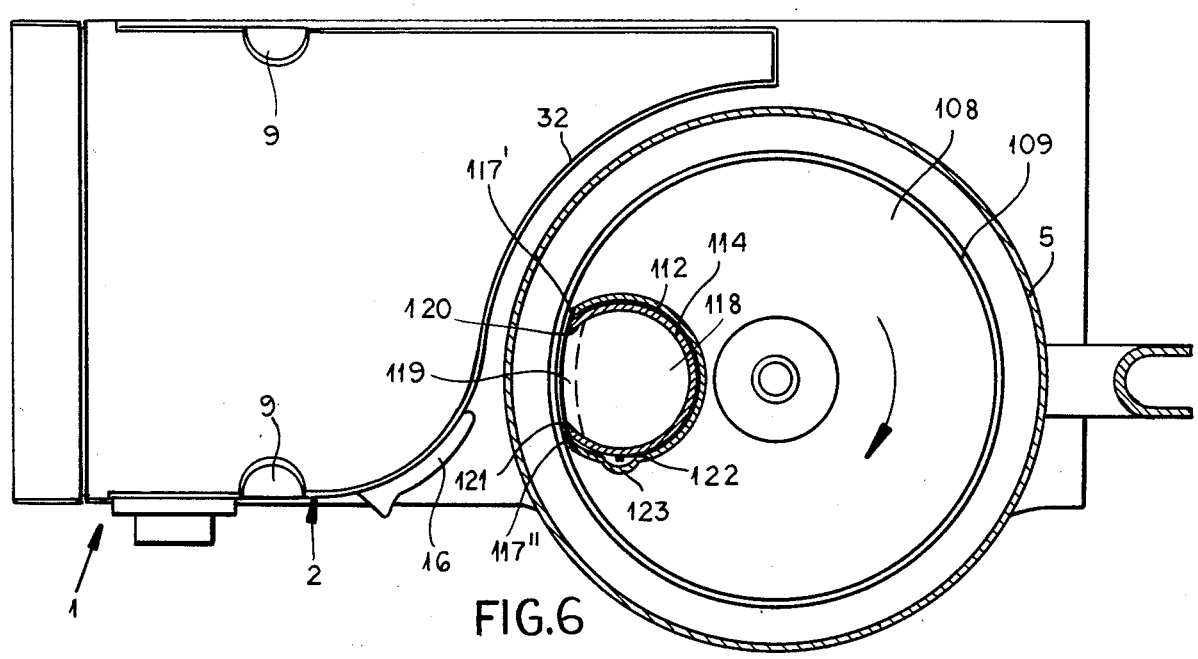
FIG. 6 is a top view shown partly in section on the line VI—VI of FIG. 5.
Figure 7:
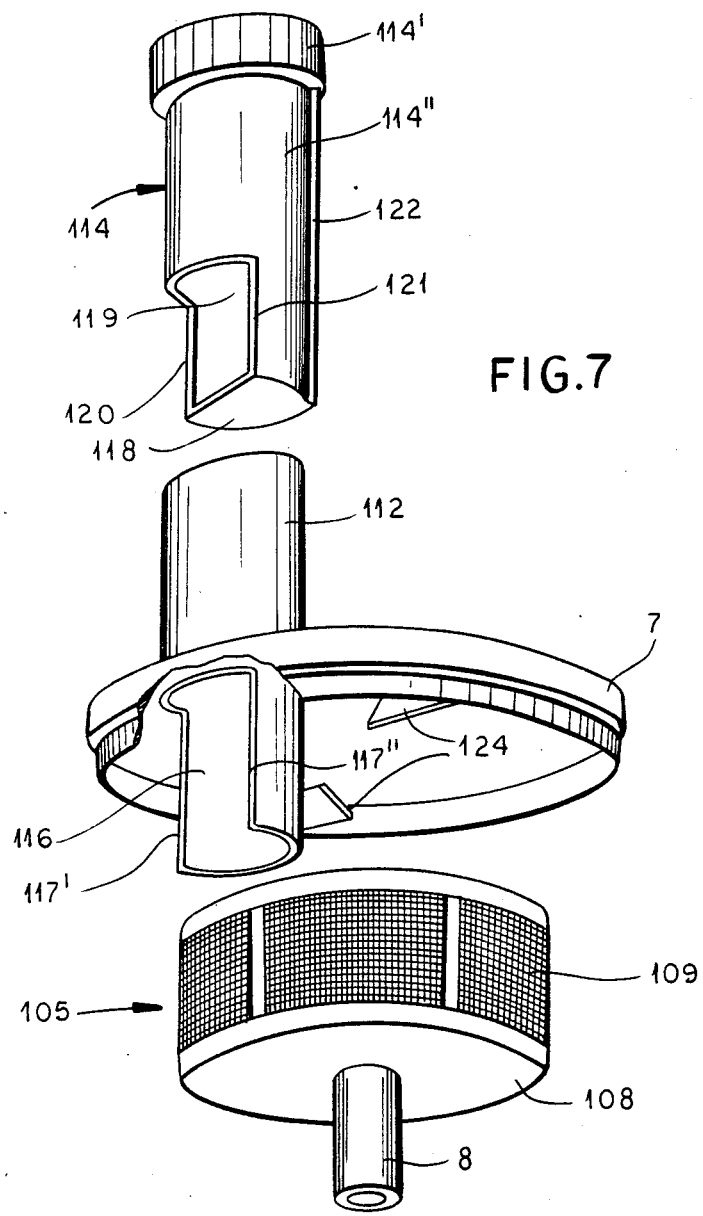
FIG. 7 is a perspective exploded view of part of the assembly illustrated in FIGS. 5 and 6.

As best seen in FIG. 7, grater 105 comprises a solid bottom disk 108 whose upper surface carries abrasive teeth represented by an array of dots in FIG. 6. The peripheral wall of the grater is formed by an annular screen 109 whose bottom edge 110 (FIG. 5) closely adjoins the rim 111 of disk 108; the two parts, however, may be detachable from each other for easier cleaning after removal from treatment vessel 5. The top of the grater is wide open and is separated only by a small gap from the overlying cover 7.

The lower part of guide tube 112 has a cutout 116 bounded by a downstream edge 117' and an upstream edge 117" as seen in the direction of rotation of the grater indicated by an arrow to be clockwise in FIG. 6. This guide tube has a vertical bulge 123 forming a groove in which a rib 122 of a pusher 114 is receivable for positive orientation relative to pusher 114. The pusher has a head 114', coming to rest at the top of tube 112, and a hollow stem 114" which is closed at its lower end 118 and is partly cut away just above that end to form a side aperture 119 which registers with the cutout 116 of tube 112 in the inserted position of FIGS. 5 and 6. Aperture 119 is laterally bounded by a downstream edge 120 and an upstream edge 121 respectively registering with tube edges 117' and 117"; plunger edge 120, however, projects beyond tube edge 117' into close contact with the inner surface of the annular screen 109 which it approaches at an acute angle pointing against the direction of rotation. The two upstream edges 117" and 121 are separated from the inner screen surface by a certain clearance to form with that surface a converging gap in which solids adhering to the screen are compacted before being scraped off by edge 120. These solids, therefore, are deflected into the interior of stem 114" and can be lifted out of the grater 105 by an upward retraction of pusher 114.

FIGS. 5 and 7 also show baffles 124 on the underside of cover 7 which are slanted downward in the direction of rotation in order to deflect the rotating produce toward the abrasive bottom 108 of the grater and away from its axis A.

In my concurrently filed application Ser. No. 577,152 I have disclosed a household-type ice-cream maker which has a removable mixing cup and a stirrer rotatably entrained by a shaft such as the one shown at 4. The safety assembly described above with reference to FIGS. 1-4 could also be used with such an appliance.

I claim:

1. A device for the treatment of produce, comprising:
   a cylindrical treatment vessel centered on a vertical axis;
   a centrifugal grater in said vessel centered on said axis and rotatable thereabout, said grater having an abrasive bottom and a peripheral screen;
   drive means coupled with said grater for rotating same;
   a cover normally closing the top of said vessel, said cover being penetrated by a vertical guide tube offset from said axis for enabling the introduction of produce into said grater; and
   a pusher receivable in said guide tube for forcing produce to be treated into contact with said abrasive bottom at a location adjacent the inner surface of said screen, said pusher having a hollow stem with a closed lower end and with a side aperture above said lower end bounded by lateral edges closely adjoining said inner surface upon introduction of said pusher into said guide tube, the lateral edge downstream in the direction of rotation of the grater scraping said inner surface to remove adhering fragments to the interior of said stem for withdrawal with said pusher.

2. A device as defined in claim 1 wherein said cover is internally provided with downwardly sloping baffles deflecting produce rotating with said grater toward said abrasive bottom thereof.

3. A device for the treatment of produce, comprising:
- a power unit provided with a housing and with a laterally extending platform having a drive shaft rising therefrom, said drive shaft being coupled with a motor in said power unit;
- a cylindrical treatment vessel fitting onto said platform and having a hub surrounding said drive shaft;
- a rotatable implement in said vessel having a depending tubular stub shaft engageable with said drive shaft for entrainment thereby;
- a removable cover for said vessel overlying said implement in a closure position, said cover and said housing being provided with coacting formations retaining said cover on said vessel in said closure position;
- switch means on said housing forming part of an energizing circuit for said motor, said switch means being closable by one of said formations in the closure position of said cover for enabling rotation of said drive shaft and of the implement connected therewith, said implement comprising a centrifugal grater centered on a vertical axis, said grater having a peripheral screen and an abrasive bottom, said cover being penetrated by a vertical guide tube offset from said axis for enabling the introduction of produce into said grater in said closure position; and
- a pusher receivable in said guide tube for forcing produce to be treated into contact with said abrasive bottom adjacent the inner surface of said screen.

4. A device as defined in claim 8 wherein said pusher has a hollow stem with a closed lower end and with a side aperture above said lower end bounded by lateral edges closely adjoining said inner surface upon introduction of said pusher into said guide tube, the lateral edge downstream in the direction of rotation of the grater scraping said inner surface to remove adhering fragments to the interior of said stem for withdrawal with said pusher.

5. A device as defined in claim 4 wherein said formations include a peripheral projection on said cover, a stop on said housing and a spring-loaded latch on said housing bearing upon said projection in said closure position for urging same against said stop, said latch being retractable for enabling a movement of said projection toward and away from said stop.

6. A device as defined in claim 5 wherein said cover and said vessel are relatively rotatable into and out of said closure position and are provided with limiting means positively interengaging in said closure position, said vessel being indexable on said platform.

7. A device as defined in claim 6 wherein said limiting means comprises a bayonet coupling.

8. A device as defined in claim 3 wherein said latch and said projection interfit in said closure position.

9. A device as defined in claim 5 wherein said switch means comprises a microswitch with a resilient tongue repressible by said projection upon contact thereof with said stop.

10. A device as defined in claim 3 wherein said cover is internally provided with downwardly sloping baffles deflecting produce rotating with said grater toward said abrasive bottom thereof.

11. A device as defined in claim 4 wherein said power unit is provided with a supply cable for energizing said motor, said housing having a compartment closable by a lid and a reel in said compartment for winding up said cable therein.

* * * * *